United States Patent
Garcia Armada et al.

(10) Patent No.: US 9,112,548 B2
(45) Date of Patent: Aug. 18, 2015

(54) METHOD TO OPTIMIZE THE POWER ASSIGNMENT OF USER STREAMS TRANSMITTED FROM BASE STATIONS IN COORDINATED BASE STATION TRANSMISSION SYSTEMS

(75) Inventors: Ana Garcia Armada, Madrid (ES); Ma Luz Pablo Gonzalez, Madrid (ES); Matilde Sanchez Fernandez, Madrid (ES); Roberto Corvaja, Madrid (ES); Ignacio Berberana Fernandez Murias, Madrid (ES)

(73) Assignee: Telefonica, S.A., Madrid (ES)

( * ) Notice: Subject to any disclaimer, the term of this patent is extended or adjusted under 35 U.S.C. 154(b) by 0 days.

(21) Appl. No.: 14/131,387

(22) PCT Filed: Jul. 6, 2012

(86) PCT No.: PCT/EP2012/063212
§ 371 (c)(1),
(2), (4) Date: Sep. 8, 2014

(87) PCT Pub. No.: WO2013/007616
PCT Pub. Date: Jan. 17, 2013

(65) Prior Publication Data
US 2015/0023442 A1    Jan. 22, 2015

(30) Foreign Application Priority Data
Jul. 13, 2011    (ES) .................................. 201131183

(51) Int. Cl.
*H04B 7/02*    (2006.01)
*H04B 7/04*    (2006.01)

(52) U.S. Cl.
CPC .............. *H04B 7/024* (2013.01); *H04B 7/0443* (2013.01)

(58) Field of Classification Search
CPC .............................. H04B 7/024; H04B 7/0443
USPC .......................... 375/260, 267, 299; 455/522; 370/203–211
See application file for complete search history.

(56) References Cited

U.S. PATENT DOCUMENTS

2009/0280760 A1 * 11/2009 Ohwatari et al. .......... 455/127.2
2010/0290382 A1    11/2010 Hui et al.

FOREIGN PATENT DOCUMENTS

WO    2010/035963 A2    4/2010

OTHER PUBLICATIONS

Bing Luo, et al., "Closed Form Solutions of Joint Water-Filling for Coordinated Transmission", IEICE Transactions on Communications, Communications Society, Dec. 1, 2010, pp. 3461-3468, vol. E93B.
Sharp, "Further Considerations on MBSFN Precoding for DL CoMP", 3GPP TSG RAN WG1 Meeting #56bis, Mar. 23-27, 2009, pp. 1/12-12/12.

(Continued)

*Primary Examiner* — Curtis Odom
(74) *Attorney, Agent, or Firm* — Sughrue Mion, PLLC

(57) ABSTRACT

A method to optimize the power assignment of user streams transmitted from base stations in coordinated base station transmission systems.
In the method of the invention said CBST systems employ block diagonalization techniques and are deployed in MIMO-OFDM scenarios, and it further comprises using a new water-filling technique which provides a performance very close to the theoretical ideal but with a reduced computational complexity.

6 Claims, 5 Drawing Sheets

(56) References Cited

OTHER PUBLICATIONS

Kun Zhao, et al., "Optimization and Performance Analysis of Zero Forcing Decision Feedback Detector for MIMO Block-Fading Channels with Per-Antenna Power Control", Wireless Personal Communications, 2006, vol. 38, pp. 481-493.

International Search Report, PCT/EP2012/063212, Sep. 17, 2012.

* cited by examiner

METHOD TO OPTIMIZE THE POWER ASSIGNMENT OF USER STREAMS TRANSMITTED FROM BASE STATIONS IN COORDINATED BASE STATION TRANSMISSION SYSTEMS

CROSS REFERENCE TO RELATED APPLICATIONS

This application is a National Stage Entry of International Application No. PCT/EP2012/063212 filed Jul. 6, 2012, claiming priority based on Spanish Patent Application No. P201131183 filed Jul. 13, 2011, the contents of all of which are incorporated herein by reference in their entirety.

FIELD OF THE ART

The present invention generally relates to a method to optimize the power assignment of user streams transmitted from base stations in coordinated base station transmission systems, said CBST systems, employing block diagonalization techniques in order to remove the interference among users and being deployed in MIMO-OFDM scenarios. More particularly it relates to a method that employs a new waterfilling technique which provides a performance very close to the theoretical ideal but with a reduced computational complexity.

Prior State of the Art

During the last years, the use of OFDM (Orthogonal Frequency Division Multiplexing), a multicarrier transmission technique of transmitting information in parallel over multiple subcarriers, has become a solution to the problem of transmitting data over wireless channels with large delay spread [1]. For this reason, it has been adopted in several wireless standards such as digital audio broadcasting (DAB), digital video broadcasting (DVB-T), IEEE 802.11a/g/n (Wi-Fi), IEEE 802.16e/m (WiMAX), and 3GPP LTE (Long Term Evolution) and LTE-Advanced.

OFDM may be combined with antenna arrays at the transmitter and receiver to increase the diversity gain and/or to enhance the system capacity in time-variant and frequency selective channels. Multiple Input-Multiple Output (MIMO) techniques have been proposed as a means to take advantage of the possible gain and capacity increase [2]. However, MIMO processing in actual cellular networks faces a significant problem: achieving gain and capacity increase through MIMO techniques requires significant Signal-to-Noise-plus-Interference Ratios (SINR) values, of the order of 15 dB [3], and these SINR values can be found only in the proximity of base stations.

As a result, in mobile broadband systems that use these technologies, a considerable gap between cell-edge and cell-centre performance is observed due to intercell interference, especially when frequency reuse one is employed, which poses the main limitation of state-of-the art mobile networks. Therefore it is key for true ubiquity of mobile broadband to bridge this gap by introducing innovative techniques.

Several technological solutions have been proposed to solve the identified problems based on cooperative base station transmission. On one hand, cooperative BS techniques allow a user to benefit from the communication from multiple BSs, especially at the cell border. Diversity is increased, the quality of communication is increased, and in general, the overall link budget is more favourable, leading to less energy consumption at the system level. On the other hand, the use of relays decreases the distance seen by the user (at cell border) and the infrastructure. As a result, the user can reach the relay with less power, saving battery life and simultaneously decreasing its contribution to the interference.

Recently some work has been devoted to manage interference in cellular systems with reuse one. In [4] a Block Diagonalization (BD) algorithm that accounts for the presence of other-cell interference (OCI) is proposed for a multiuser MIMO downlink. It uses a whitening filter for interference suppression at the receiver and a precoder using the interference-plus-noise covariance matrix for each user in the transmitter at the base station. In this proposal the transmitter has perfect Channel State Information (CSI) and perfect knowledge of the whitening filter. So far, this technique has been usually employed over flat fading channels.

In FIG. 1 an illustration of this system will be shown, where the equivalent received signal after the interference-suppression filter is given by:

$$r_k = W_k H_k x_k + W_k H_k \sum_{l=1,l\neq k}^{K} x_l + W_k z_k =$$

$$W_k H_k M_k s_k + W_k H_k \sum_{l=1,l\neq k}^{K} M_l s_l + W_k z_k ==$$

$$W_k H_k B_k D_k s_k + W_k H_k \sum_{l=1,l\neq k}^{K} B_l D_l s_l + W_k z_k = \overline{H}_{eff,k} D_k s_k + W_k z_k$$

where the interference of other users is eliminated using the precoder $B_k$. The matrix $W_k$ is a whitening or an interference-suppression filter that is only determinate by the interference plus noise covariance matrix independent of each user's channel. On the other hand, the precoder $M_k$ is a cascade of two precoding matrices $B_k$ and $D_k$ for block diagonalization ($M_k = B_k D_k$) where $B_k$ removes the intra-cell interference and $D_k$ is used for parallelizing and power allocation by means of the standard waterfilling technique. The transmit precoder $M_k$ requires the Singular Value Descomposition (SVD) of $\overline{H}_{eff,k}$ that includes $W_k$ as the information of interference-plus-noise covariance matrix for each user:

$$\overline{H}_{eff,k} = W_k H_k B_k = U_k \begin{bmatrix} \Lambda_k \\ 0 \end{bmatrix} V_k^H$$

So each receiver has to inform Wk to the transmitter.

In [5] the authors analyze several approaches for overcoming interference in MIMO cellular networks. If the interference is known by the transmitters, cooperative encoding among base stations using Dirty Paper Coding (DPC) can suppress OCI. This scheme has been shown to achieve the (maximum theoretical) capacity of the multiuser MIMO downlink channel. However, it has a high computational complexity.

In [6] [7] several strategies are proposed to perform Coordinated Base Station Transmission (CBST). Interference is eliminated by jointly and coherently coordinating the transmission from the base stations in the network, assuming that base stations know all downlink signals.

In a Coordinated Base Station Transmission (CBST) scheme, the transmitted signal from a particular BS may eventually arrive, depending on the propagation conditions, to a certain number of adjacent users in the cellular system that are served by other BSs. Under this assumption, the channel may be modelled by a N·r×M·t matrix H where each matrix coefficient represents the fading from each transmit antenna in the BS to each receive antenna at the user side. The received signal model is as follows:

$$y = Hx + n$$

where y is the received N·r×1 signal vector, x is the M·t×1 signal vector transmitted from all the BSs, and n is the $N_r \times 1$ independent and identically distributed complex Gaussian noise vector with variance $\sigma^2$.

If $H_k$, with k=1 ... N, is defined as the r×M·t channel matrix seen by user k, then $$H = [H_1^T H_2^T \ldots H_N^T]$$

where the superscript T means transposed.

For the CBST scenario x can be defined as follows $$x = \sum_{i=1}^{r} b_{1i} w_{1i} + \sum_{i=1}^{r} b_{2i} w_{2i} + \cdots + \sum_{i=1}^{r} b_{Ni} w_{Ni} = Wb$$

where $b_{ki}$ represents the i-th symbol for user k transmitted with power $P_{ki}$, and $w_{ki} = [w_{ki}^1, \ldots, w_{ki}^{(m-1)t+j}, \ldots, w_{ki}^{Mt}]^T$ are the precoding vectors being $w_{ki}^{(m-1)t+j}$ the weight of j-th transmit antenna (j=1 ... t) of the m-th base station for the i-th symbol of the user k transmitted.

The precoding matrix $$W = [w_{11}, \ldots, w_{1r}, \ldots, w_{k1}, \ldots, w_{kr}, \ldots, w_{N1}, \ldots, w_{Nr}]$$

will be obtained under a Zero-Forcing criteria to guarantee that $$H_k[w_{q1}, w_{q2}, \ldots, w_{qr}] = \begin{cases} 0 : & k \neq q \\ U_k S_k : & k = q \end{cases}$$

$$\|w_{ki}\|^2 = 1, k = 1, \ldots, N, i = 1, \ldots, r$$

where $U_k$ is a unitary matrix and $S_k = \text{diag}\{(\lambda_{k1})^{1/2}, (\lambda_{k2})^{1/2}, \ldots, (\lambda_{kr})^{1/2}\}$ is a diagonal matrix that contains the square roots of the nonzero eigenvalues of the matrix $Q_k Q_k^T$, being $Q_k$ the part of the channel matrix $H_k$ orthogonal to the subspace spanned by other users' channels $H_q$ (q≠k).

Then, the received signal can be expressed as $$y = \begin{bmatrix} U_1 S_1 & 0 & \ldots & 0 \\ 0 & U_2 S_2 & \ldots & 0 \\ \vdots & \vdots & \ddots & \vdots \\ 0 & 0 & \ldots & U_N S_N \end{bmatrix} b + n$$

Each user may independently rotate the received signal and decouple the different streams $$\tilde{y} = \begin{bmatrix} U_1 & 0 & \ldots & 0 \\ 0 & U_2 & \ldots & 0 \\ \vdots & \vdots & \ddots & \vdots \\ 0 & 0 & \ldots & U_N \end{bmatrix} y = \begin{bmatrix} (\lambda_{11})^{1/2} b_{11} \\ \vdots \\ (\lambda_{1r})^{1/2} b_{1r} \\ \vdots \\ (\lambda_{Nr})^{1/2} b_{Nr} \end{bmatrix} + \tilde{n}$$

where the noise $\tilde{n}_k$ remains white with the same covariance because of the unitary transformation.

Thus, the signal obtained by k-th user can be expressed as:

$$y = U_k S_k b_k + \tilde{n}_k = \begin{bmatrix} (\lambda_{k1})^{1/2} b_{11} \\ \vdots \\ (\lambda_{kr})^{1/2} b_{kr} \end{bmatrix} + \tilde{n}_k$$

Thus, under an ideal Block Diagonalization strategy, the overall system can be seen as a set of parallel noninterfering channels. The problem lies in determining the powers involved in this parallel system ("Power allocation" as it will be shown in FIG. 2). The optimal solution can be obtained numerically by using convex optimization as in [6] and [7]. However, it is associated with a heavy computational complexity. In this invention, we propose a scheme which achieves a performance very close to the optimal but without its high complexity.

Document "Closed form solutions of joint water-filing for coordinated transmission", (IECE Transactions on communications, communications society; ISSN: 0916-8516, DOI: 10.1587/TRANSCOM.E93.B.3461), refers to a power allocation scheme for a frequency-selective fading channel with multiple coordinated transmission points (CTP) in which each CTP has a power constraint and an individual channel state information (CSI). The solutions described turns out to take the form of traditional WF and also combined with some regular cooperative feature.

International patent application No. WO201/035963A2, describes a method and apparatus of configuring a multi-cell precoding matrix for a multiple input multiple output (MIMO) operation in a wireless communication system in which a plurality of base stations participate in cooperative communication is provided. According to this document, it is not necessary for all base stations to perfectly know channel information.

Further, document US2010290382A1, refers to a coordinates multi point (COMP) system in which the base station in each serving cell is allowed to use not only its own antennas but also antennas of neighboring base stations to transmit to mobile terminal in the serving cell to form a floating CoMP cell.

DESCRIPTION OF THE INVENTION

It is necessary to offer an alternative to the state of the art which covers the gaps found therein, particularly related to the lack of proposals which allows reducing the heavy computational complexity associated to convex optimization, which is the optimal technique used to solve the power assignment problem in CBST systems.

To that end, the present invention provides a method to optimize the power assignment of user streams transmitted from base stations in coordinated base station transmission systems, said CBST systems, employing block diagonalization techniques in order to remove the interference among users and being deployed in MIMO-OFDM scenarios, wherein said optimization is subject to a plurality of constraints on the maximum available power transmission from each base station.

On contrary to the known proposals, in the method of the invention, in a characteristic manner it comprises solving said optimization of power assignment with a single constraint considering an equivalent base station among said base stations, wherein said single constraint is the most stringent of said plurality of constraints.

The method of the invention comprises using a new waterfilling technique which provides a performance very close to the theoretical ideal but with a reduced computational complexity.

Other embodiments of the method of the first aspect of the invention are described according to appended claims 2 to 7, and in a subsequent section related to the detailed description of several embodiments.

BRIEF DESCRIPTION OF THE DRAWINGS

The previous and other advantages and features will be more fully understood from the following detailed description of embodiments, with reference to the attached drawings (some of which have already been described in the Prior State of the Art section), which must be considered in an illustrative and non-limiting manner, in which.

DETAILED DESCRIPTION OF SEVERAL EMBODIMENTS

The present invention is addressed to methods and apparatus for enhancing overall throughput in the LTE Advanced (LTE-A) mobile communications system that supports cooperative base station transmission in the downlink. The invention proposes a method to optimize the power assignment to the user streams to be transmitted from different base stations. A BD scheme is employed to remove interference among users, using a new waterfilling technique which provides a performance very close to the theoretical ideal but with a reduced computational complexity.

Coordinated multi-point (CoMP) transmission and reception has been considered for LTE-Advanced as a tool to improve the coverage of high data rates, the cell-edge throughput, and also to increase system throughput.

The 3GPP has been working on LTE-A since early 2008. In March 2010 a Study Item on Coordinated Multiple Point (CoMP) was closed and a Work Item on extended Inter-Cell Interference Coordination for co-channel deployments of heterogeneous networks was started. The first decisions have been taken and will form the basis for LTE-Advanced standardization in Release 10 that are being reflected in the 3GPP Technical Report TR 36.814.

At the moment, CoMP is being analyzed in 3GPP as a Study Item. The framework of the CoMP study shall cover both intra-eNodeB as well as inter-eNodeB CoMP, and include investigation of spatial domain cooperation, e.g., spatial domain inter-cell scheduling and/or interference coordination, and other cooperation methods. Some objectives are: evaluate the performance benefits of CoMP operation and the required specification support for certain proposed scenarios, identify potential enhancements for DL-CoMP operation, evaluate applicability of X2 interface for different CoMP modes/schemes, and identify potential standardization impact for UL-CoMP operation and evaluate its performance benefit.

Figure 1:
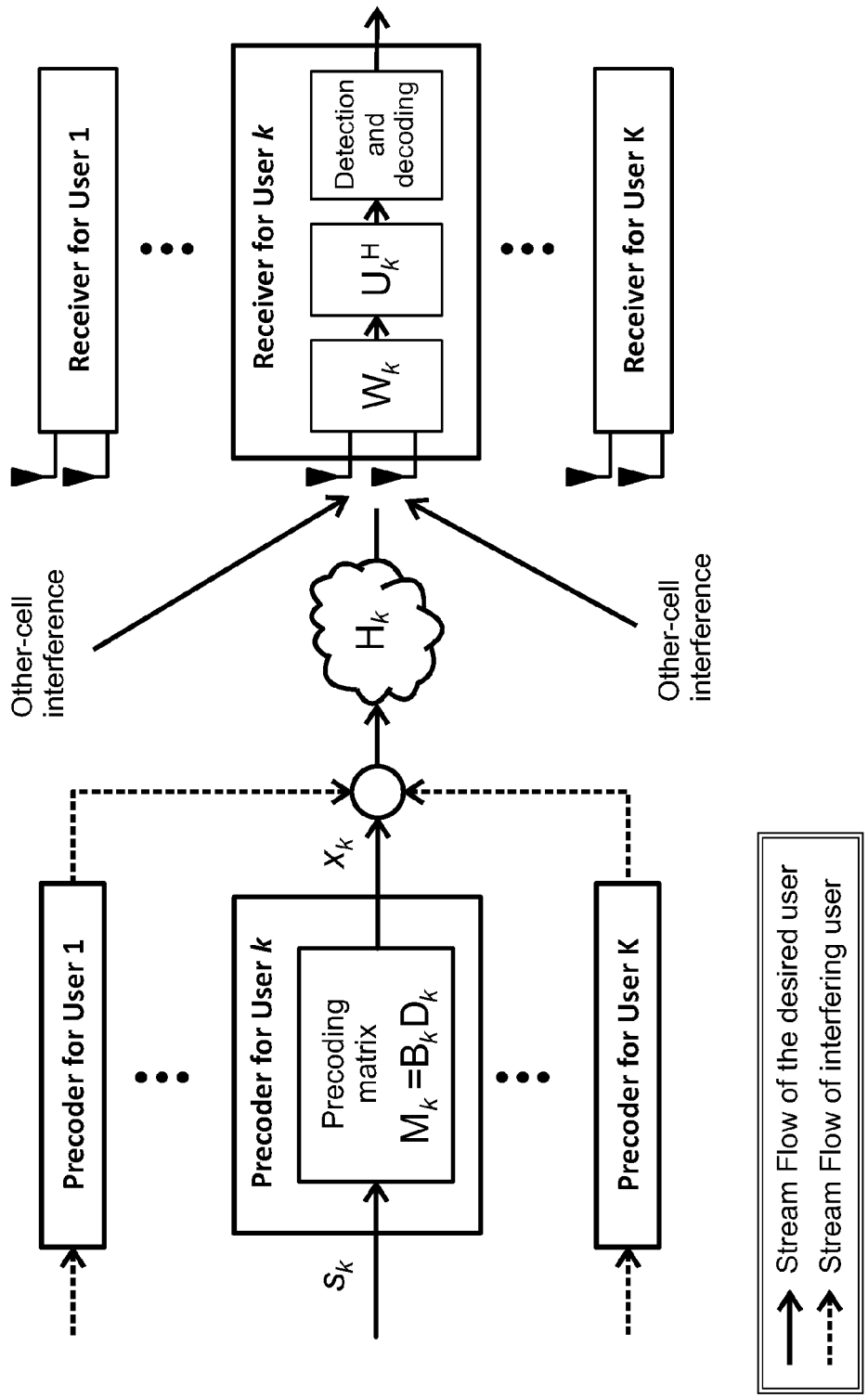
FIG. 1 shows current systems of downlink multiuser MIMO with Block Diagonalization in presence of interference.
Figure 2:
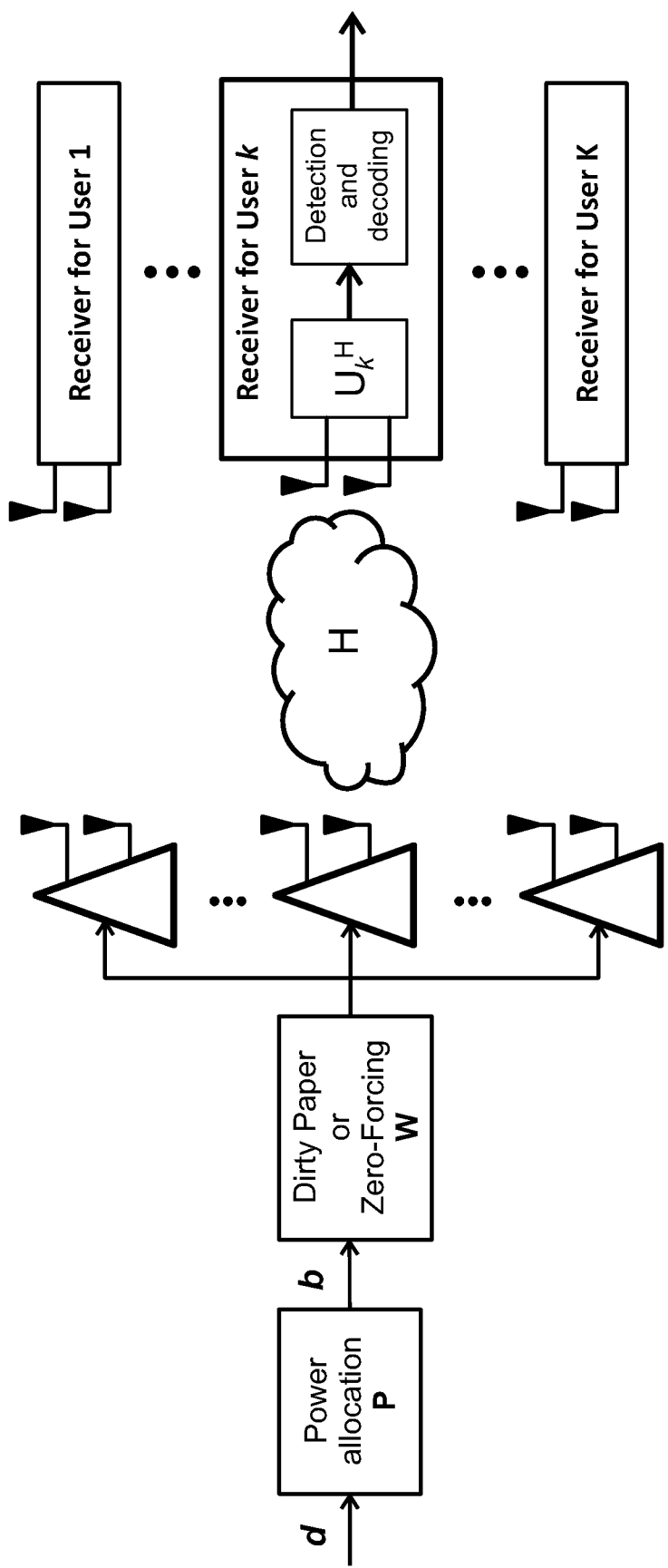
FIG. 2 shows current general scheme for Coordinated Base Station Transmission systems.
Figure 3:
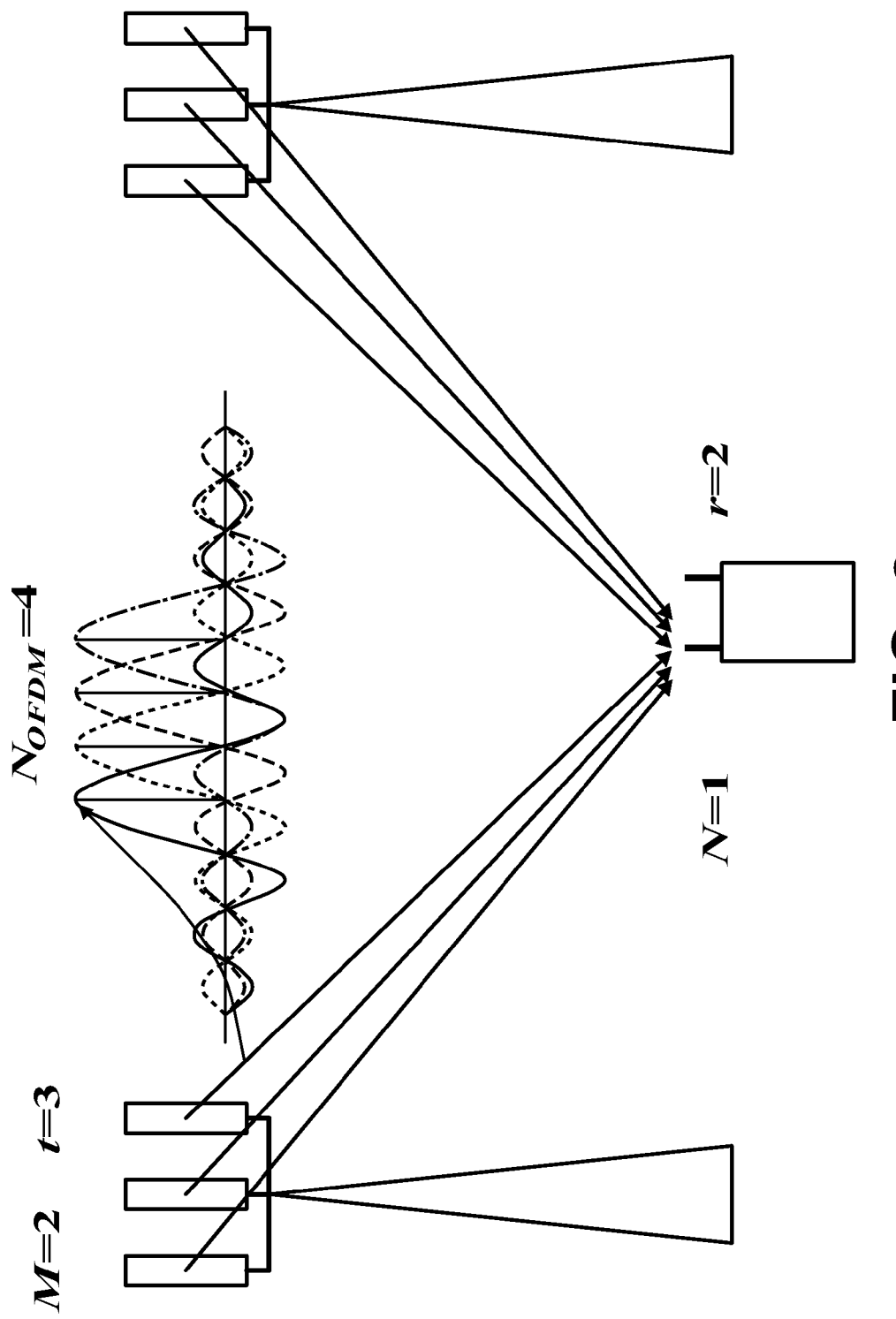
FIG. 3 shows a possible scenario where the method of the invention may apply, according to an embodiment of the present invention.

The system of the invention applies to an OFDM wireless system where the whole channel is known to transmitter and receiver. This is usually the case for a bidirectional transmission system where CSI is available at the receiver side after channel estimation and a signalling channel can be used to forward the CSI to the transmitter, like LTE. The system is intended to implement coordinated transmission for the downlink, where M base stations (BS) serve N UEs. Each base station has t transmit antennas and each UE has r receive antennas. The operational conditions are characterized by a linear block fading channel with frequency selective fading and additive Gaussian noise. Provided that the length of the cyclic prefix is chosen longer than the longest impulse response, the channel seen by each user can be decomposed into $N_{OFDM}$ independent flat subcarriers (at the same time, a set of subcarriers may be grouped in subchannels). An example of the system analyzed was represented in FIG. 3.

Extending the previous equations to OFDM signals, the achievable rates per user in a MIMO-OFDM scenario based on CBST with Block Diagonalization technique are as follows $$R_k = \sum_{p=1}^{N_{OFDM}} \sum_{i=1}^{r} \log_2\left(1 + \frac{\lambda_{ki}^p P_{ki}^p}{\sigma^2}\right) \quad (1)$$

In order to maximize a weighted sum of the rates $R_k$ for the set of users, it is required to solve the following optimization problem in terms of the power $P_{ki}^p$ allocated to the i-th stream of user k:

$$\max\left\{\sum_{k=1}^{N} \alpha_k \sum_{p=1}^{N_{OFDM}} \sum_{i=1}^{r} \log_2\left(1 + \frac{\lambda_{ki}^p P_{ki}^p}{\sigma^2}\right)\right\} \quad (2)$$

subject to a constraint on the maximum available power for transmission from each base station $P_{max}$:

$$P_{BSm} = \sum_{j=1}^{t} \underbrace{\sum_{p=1}^{N_{OFDM}} \sum_{k=1}^{N} \sum_{i=1}^{r} P_{ki}^p \left|w_{ki}^{p,((m-1)\cdot t+j)}\right|^2}_{j \text{ transmit antenna power}} \leq P_{max}, \forall m = 1\ldots M \quad (3)$$

In (2) the values $\alpha_k \in [0,1]$, $\Sigma_{k=1}^{N}\alpha_k=1$, can be seen as indicating the priorities of the users: the closer $\alpha_k$ is to 1, the higher the priority given to user k. In the particular case of $\alpha_k=1/N$, for all k, the solution of the above problem maximizes the sum rate.

The problem above is convex since the logarithmic function is concave in the power assignments, the addition operation preserves concavity and the constraints (3) are linear. Therefore it can be solved by standard convex optimization techniques [8]. This optimum solution is given by:

$$P_{ki}^p = \sigma^2 \left[ \frac{\alpha_k}{\ln(2)L_{ki}^p} - \frac{1}{\lambda_{ki}^p} \right]$$

$$L_{ki}^p = -\sum_{m=1}^M \sum_{j=1}^t \mu_m \left| w_{ki}^{p,(m-1)t+j} \right|^2$$

$$\sum_{j=1}^t \sum_{p=1}^{N_{OFDM}} \sum_{k=1}^N \sum_{i=1}^r P_{ki}^p \left| w_{ki}^{p,(m-1)t+j} \right|^2 = P_{max}$$

which resembles the well-known waterfilling distribution. However, here the waterlevel is different for each symbol i to be transmitted to each user k on each subcarrier p. Even though the values of the waterlevels can be found again by convex optimization techniques, it still has a similar computational complexity. So, closed-form solutions, even if suboptimal, would be desirable in order to reduce this computational time and resources required for the optimization.

This invention proposes a new method for solving the power allocation problem described above which makes it possible to be implemented in computational effective way without significant performance degradation.

By considering the most stringent of the constraints in (3), the problem can be reduced to an "equivalent" base station $m_0$ having for each symbol transmitted to each user the precoding weights whose sum of squared values is maximum among all the BSs, that is:

$$\Omega_{ki}^p = \max_{m=1...M} \left( \sum_{j=1}^t | w_{ki}^{p,((m-1)t+j)} |^2 \right) \quad (4)$$

So the problem reduces to:

$$\max \left\{ \sum_{k=1}^N \alpha_k \left( \sum_{p=1}^{N_{OFDM}} \sum_{i=1}^r \log_2 \left( 1 + \frac{\lambda_{ki}^p P_{ki}^p}{\sigma^2} \right) \right) \right\}$$

subject to:

$$\sum_{p=1}^{N_{OFDM}} \sum_{k=1}^N \sum_{i=1}^r P_{ki}^p \Omega_{ki}^p \leq P_{max} \quad (5)$$

The resultant problem is equivalent to finding a constant value K such that, for all the power levels $P_{ki}^p$, the following equations hold $$P_{ki}^p = \left[ K \frac{\alpha_k}{\Omega_{ki}^p} - \frac{\sigma^2}{\lambda_{ki}^p} \right]^+ \quad (6)$$

with $$K = \frac{-\sigma^2}{\ln(2)\mu} \quad (7)$$

where [.]+ denotes the maximum between zero and the argument and $\mu$ is the Lagrange multiplier used to maximize the weighted sum rate of the users. This corresponds again to a waterfilling distribution with variable waterlevel. However, for given user priorities $\alpha_k$ and channel realization determining $\lambda_{ki}^p$ and $\Omega_{ki}^p$, the problem reduces to finding a constant K that can be solved with the same algorithms that solve standard waterfilling [9].

In order to further simplify the solution to the optimization problem, it may be considered that in a practical realizations the values of $\Omega_{ki}^p$ are close to each other for all k, i and p. Then the solution (6) can be simplified to give:

$$P_{ki}^p = \left[ K\alpha_k - \frac{\sigma^2}{\lambda_{ki}^p} \right]^+ \quad (8)$$

which corresponds to a waterfilling distribution with the waterlevel modified only by the user priorities. In particular for equal priorities $\alpha_k = 1/N$ it corresponds to a standard waterfilling.

To sum up, the proposed solutions for this power assignment problem can be summarized through the following equations:

PROPOSED SOLUTION $$P_{ki}^p = \left[ K \frac{\alpha_k}{\Omega_{ki}^p} - \frac{\sigma^2}{\lambda_{ki}^2} \right]^+ \text{ with } K = \frac{-\sigma^2}{\ln(2)\mu}$$

$$\text{If } \Omega_{ki}^p \cong \sim \Omega_{k'i'}^{p'}, \forall k, i, p: P_{ki}^p = \left[ K\alpha_k - \frac{\sigma^2}{\lambda_{ki}^p} \right]^+$$

Advantages of the Invention

The invention allows for the practical implementation of a cooperative multipoint transmission technique that may help to provide the capacity required to meet the future traffic demand for mobile broadband services. The invention proposed provides a solution for the power allocation in a CBST environment with a much lower complexity with respect to other possible solutions like Dirty Paper Coding without a significant loss of performance. This reduced complexity may allow supporting the technique with a lower cost, due to the use of hardware with lower processing capabilities. The technique will also allow for the support of higher bit rates for those users located in the cell edges, with low SINR operating conditions, and providing them with a better Quality of experience.

Numerical Results of the Invention

Next, it will be performed a comparison of the performance in terms of achievable rates of the proposed waterfilling (WF), modified waterfilling (MWF) and the optimum solution found by convex optimization (CVX). For the sake of comparison the rates achieved when using a uniform power distribution (UP) are also included.

A simple two-BS, two-user scenario is considered. Here a simplified frequency-selective channel model with $N_{path}$ paths and an exponential power-delay profile (PDP) are employed. Therefore, the channel matrix of the n-th path is $$H(n) = \left( \frac{1 - e^{-2\beta}}{1 - e^{-2\beta N_{path}}} \right)^{1/2} e^{-\beta n} \cdot H_G$$

where $\beta$ is the factor which indicates the decreasing speed of the power, and $H_G$ is a matrix whose entries are independent and identically distributed complex Gaussian random variables with zero mean and variance 1. Due to a high computational complexity of the CVX, an OFDM system with 8 subcarriers will be considered, although the results can be extended to more subcarriers.

Figure 4:
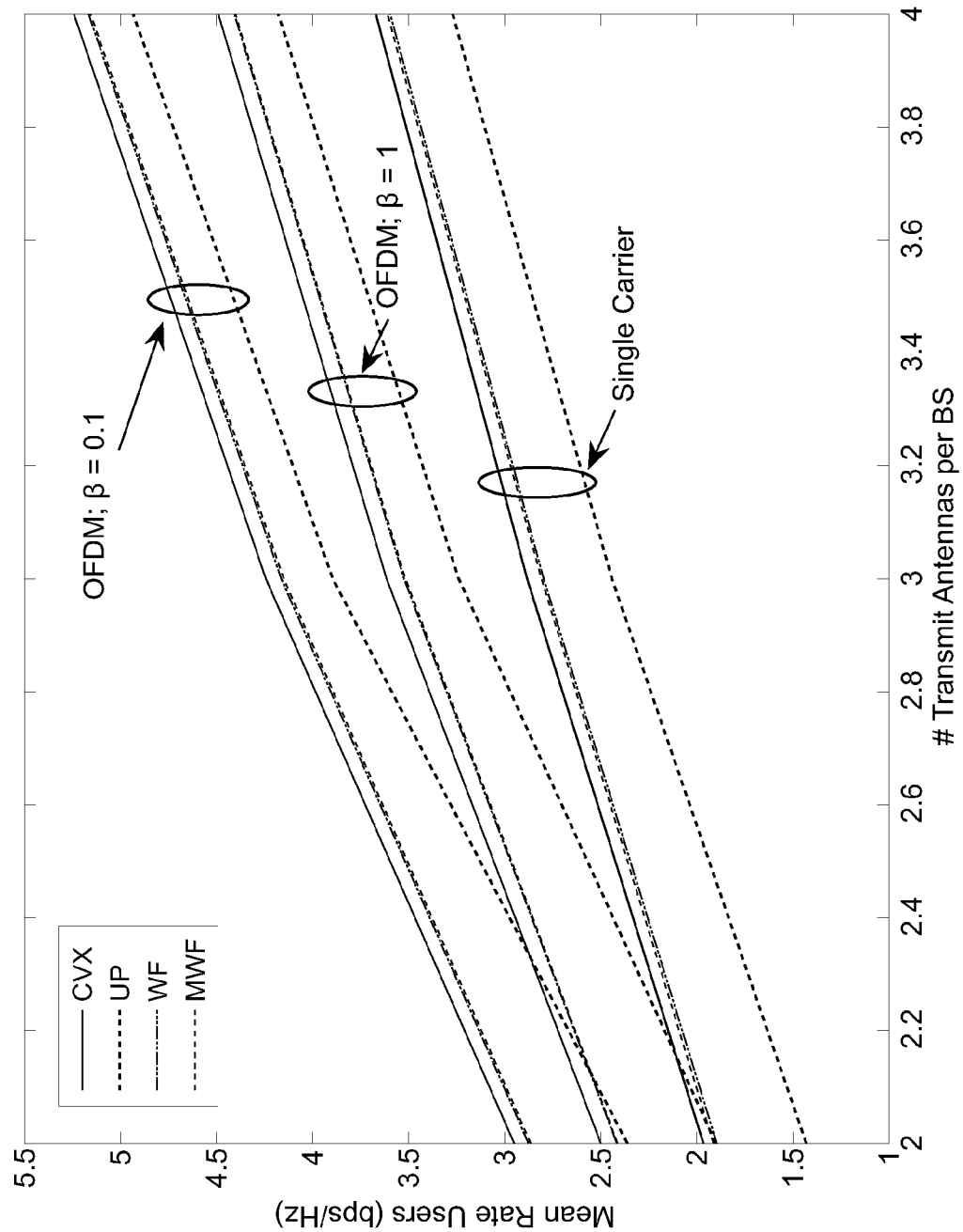
FIG. 4 shows the mean achievable rates as function of the number of transmit antennas per base station comparing the three different approaches and the uniform power location as a reference, according to the numeric results obtained with the method of the present invention.

In FIG. 4 it was shown the mean rates as function of the number of transmit antennas per BS comparing the three different approaches and the uniform power allocation as a reference. A single carrier system is used as reference too. The number of receiver antennas is equal to 2 and two different values of β are considered. Moreover, the same priority is assigned to both users. It can be seen that the gap between the mean rates obtained with WF and MWF and the optimal solution CVX is quite narrow. These rates are considerably higher than what is achieved by UP.

Figure 5:
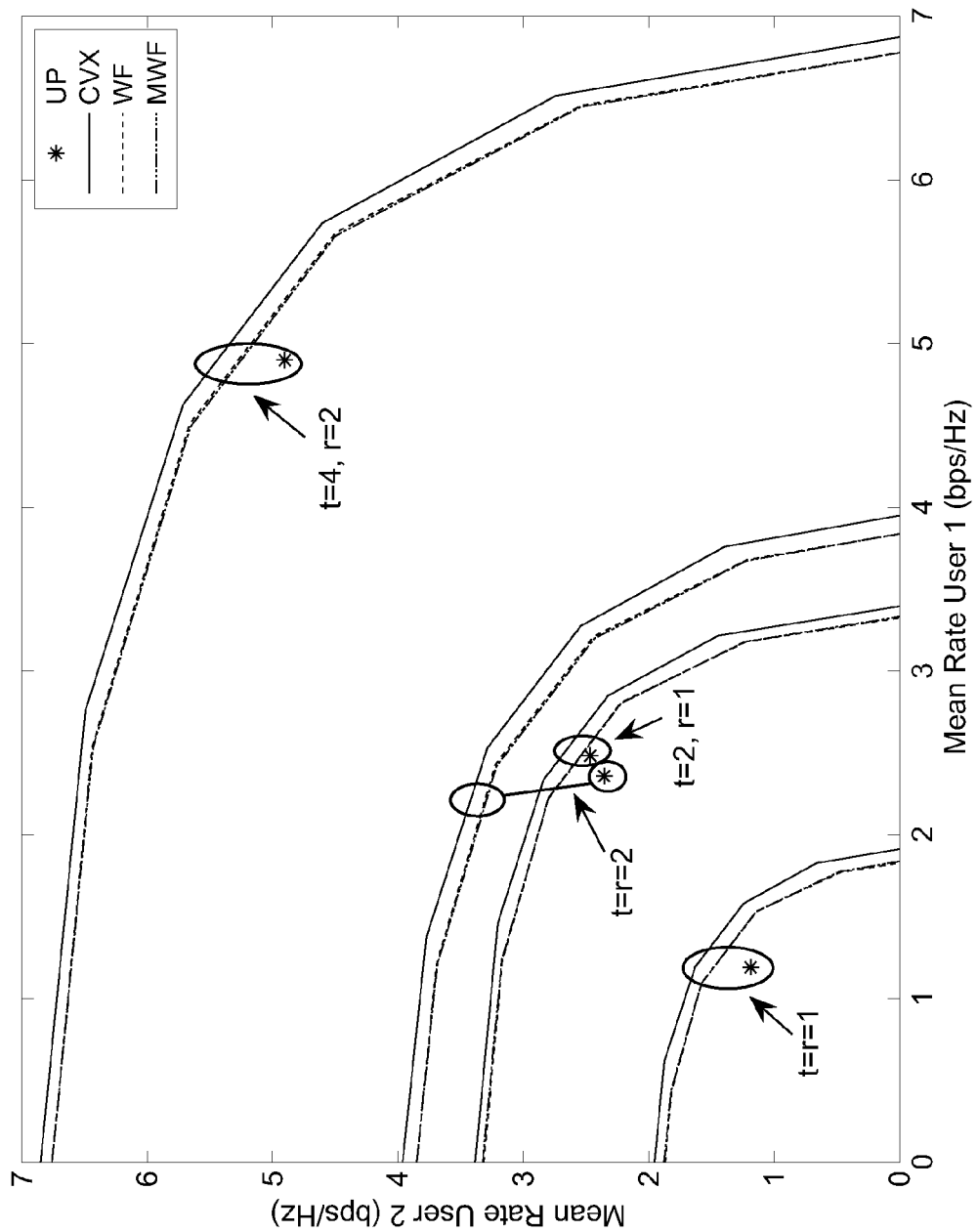
FIG. 5 shows the region of achievable rates for each proposed scheme, according to the numeric results obtained applying the method of the present invention.

In FIG. 5 it was shown the region of achievable rates for each proposed scheme. A value of β=0.1 has been chosen, that means a channel with high frequency selectivity is used. Different values of the number of transmit and receive antennas are considered. As in the FIG. 4, the achievable rates obtained with WF and MWF are very close to the optimal solution CVX.

A person skilled in the art could introduce changes and modifications in the embodiments described without departing from the scope of the invention as it is defined in the attached claims.

Acronyms
3GPP Third Generation Partnership Project
BD Block Diagonalization
BS Base Station
CBST Coordinated Base Station Transmission
CSI Channel State Information
DAB Digital Audio Broadcasting
DPC Dirty Paper Coding
DVB-T Digital Video Broadcasting-Terrestrial
LTE Long Term Evolution
LTE-A Long Term Evolution-Advanced
MIMO Multiple Input Multiple Output
OCI Other-Cell Interference
OFDM Orthogonal frequency Division Multiplexing
SINR Signal-to-Noise-plus-Interference Ratio
UE User Equipment
WF Waterfilling
ZF Zero-Forcing References

[1] J. A. C. Bingham, "Multicarrier modulation for data transmission: An idea whose time has come", IEEE Communications Magazine, Vol. 28, No. 5, pp. 5-14, May 1990.
[2] G. J. Foschini and M. J. Gans, "On Limits of Wireless Communications in a Fading Environment When Using Multiple Antennas", Wireless Personal Communications, Vol. 6, No. 3, pp. 311-335, March 1998.
[3] H. Takahashi, Y. Ofuji, S. Fukumoto, S. Abeta and T. Nakamura, "Field Experimental Results on E-UTRA Downlink Throughput Using Polarization Diversity Antennas", IEEE Vehicular Technology Conference, April 2009.
[4] S. Shim, J.-S. Kwak, R. W. Heath, Jr., and J. G. Andrews, "Block Diagonalization for Multi-User MIMO with Other-Cell Interference", IEEE Transactions on Wireless Communications, Vol. 7, No. 7, pp. 2671-2681, July 2008.
[5] J. G. Andrews et al., "Overcoming Interference in Spatial Multiplexing MIMO Cellular Networks", IEEE Wireless Communications, Vol. 14, No. 6, pp. 95-104, December 2007.
[6] M. K. Karakayali, G. J. Foschini, R. A. Valenzuela, "Network coordination for spectrally efficient communications in cellular systems", IEEE Wireless Communications, Vol. 13, No. 4, pp. 56-61, August 2006.
[7] G. J. Foschini, K. Karakayali, R. A. Valenzuela, "Coordinating multiple antenna cellular networks to achieve enormous spectral efficiency", IEEE Proceedings Communications, Vol. 153, No. 4, pp. 548-555, August 2006.
[8] S. Boyd, L. Vandenberghe, "Convex Optimization", Cambridge Univesity Press, NY, USA, 2004.
[9] J. M. Cioffi, "Advanced Digital Communications, EE379c", Stanford University Course Notes, http://www.stanford.edu/class/ee379c

The invention claimed is:

1. A method to optimize power assignment of user streams transmitted from base stations in coordinated base station transmission systems (CBST), the CBST systems employing block diagonalization techniques and being deployed in Multiple Input-Multiple Output Orthogonal Frequency Division Multiplexing (MIMO-OFDM) scenarios, wherein the optimization is subject to a plurality of constraints on maximum available power transmission from each of the base stations, the method comprising:
  solving the optimization of the power assignment with a single constraint, using a processor, considering an equivalent base station among the base stations, wherein the single constraint is a most limiting constraint of the plurality of constraints, and wherein the single constraint is based on a function comprising precoding weights whose sum of squared values is maximum among all the base stations of each symbol transmitted to each user.

2. The method according to claim 1, comprising defining the function according to an expression:

$$\Omega_{ki}^p = \max_{m=1\ldots M}\left(\sum_{j=1}^t |w_{ki}^{p,((m-1)\cdot t+j)}|^2\right)$$

where
  w is the precoding weight;
  p is an index of a subcarrier;
  k is an index of the user;
  i is an index of the symbol to be transmitted;
  M is a number of the base stations;
  t is a number of antennas of each of the base stations; and
  max calculates a maximum value.

3. The method according to claim 2, comprising defining the single constraint according to an expression:

$$\sum_{p=1}^{N_{OFDM}} \sum_{k=1}^{N} \sum_{i=1}^{r} P_{ki}^p \Omega_{ki}^p \leq P_{max}$$

where
  $N_{OFDM}$ is a number of independent flat subcarriers by which a channel seen by the user is decomposed into;
  N is a number of user equipments;
  r is a number of antennas on each of the user equipments;
  $P_{ki}^p$ is a level of the power assignment of the user stream of user k, for symbol I and subcarrier p; and
  $P_{max}$ is the maximum available power for transmission from each of the base stations.

4. The method according to claim 3, comprising performing the optimization by solving an expression:

$$\max\left\{\sum_{k=1}^{N}\alpha_k\left(\sum_{p=1}^{N_{OFDM}}\sum_{i=1}^{r}\log_2\left(1+\frac{\lambda_{ki}^p P_{ki}^p}{\sigma^2}\right)\right)\right\}$$

subject to the single constraint, where
- $\alpha_k$ indicates a priority of user k and is a number between 0 and 1;
- $\lambda_{ki}^p$ is a nonzero eigenvalue of the matrix product of $Q_k Q_k^T$, wherein T means transposed;
- $Q_k$ is a part of a channel matrix $H_k$ orthogonal to a subspace spanned by other users' channels $H_q$ (k≠q);
- $H_k$ is a M·t x r channel matrix seen by the user k; and
- $\sigma^2$ is a variance of Gaussian noise.

5. The method according to claim 4, wherein a result of the optimization comprises an expression:

$$P_{ki}^p = \left[K\frac{\alpha_k}{\Omega_{ki}^p} - \frac{\sigma^2}{\lambda_{ki}^p}\right]^+$$

where $$K = \frac{-\sigma^2}{\ln(2)\mu}$$

μ is a Lagrange multiplier used to maximize a weighted sum rate of the users;

[ ... ]⁺ expresses a maximum value between zero and an argument.

6. The method according to claim 5, comprising considering values of $\Omega_{ki}^p$ equal for all k, i and p and defining the result of the optimization according to an following expression:

$$P_{ki}^p = \left[K\frac{\alpha_k}{\Omega_{ki}^p} - \frac{\sigma^2}{\lambda_{ki}^p}\right]^+.$$

* * * * *